United States Patent [19]

Laimer et al.

[11] 4,212,453
[45] Jul. 15, 1980

[54] PLANT FOR REFINING PIG IRON

[75] Inventors: Friedrich Laimer, Perg; Herbert Herrmann, Linz, both of Austria

[73] Assignee: Voest-Alpine Aktiengesellschaft, Linz, Austria

[21] Appl. No.: 874,400

[22] Filed: Feb. 2, 1978

[30] Foreign Application Priority Data

Feb. 21, 1977 [AT] Austria .................................. 1133/77

[51] Int. Cl.$^2$ .............................................. C21C 5/40
[52] U.S. Cl. ........................................ 266/158; 75/60
[58] Field of Search ......... 75/60; 98/115 R, 115 VM; 266/142, 143, 158

[56] References Cited

U.S. PATENT DOCUMENTS

| | | | |
|---|---|---|---|
| 3,743,264 | 7/1973 | Baum et al. ........................... | 266/158 |
| 3,972,708 | 8/1976 | Baum .................................... | 266/158 |
| 4,049,246 | 9/1977 | Ziegler ................................. | 98/115 R |
| 4,076,223 | 2/1978 | Schempp .............................. | 266/158 |
| 4,094,496 | 6/1978 | Readal ................................... | 266/158 |

Primary Examiner—Paul A. Bell
Attorney, Agent, or Firm—Brumbaugh, Graves, Donohue & Raymond

[57] ABSTRACT

A plant for refining pig iron by means of oxygen or gases enriched with oxygen has a chamber accommodating a converter and having an upper part, a lower part, a ceiling, a principal hood connected to the ceiling, a closeable charge opening, and a secondary hood provided in the upper part of the chamber, with this chamber the principal hood forms a displaceable unit with a part of the ceiling surrounding it, the secondary hood is united with a stationary part of the ceiling, and the charge opening is closeable by a sliding door guided on rails.

4 Claims, 1 Drawing Figure

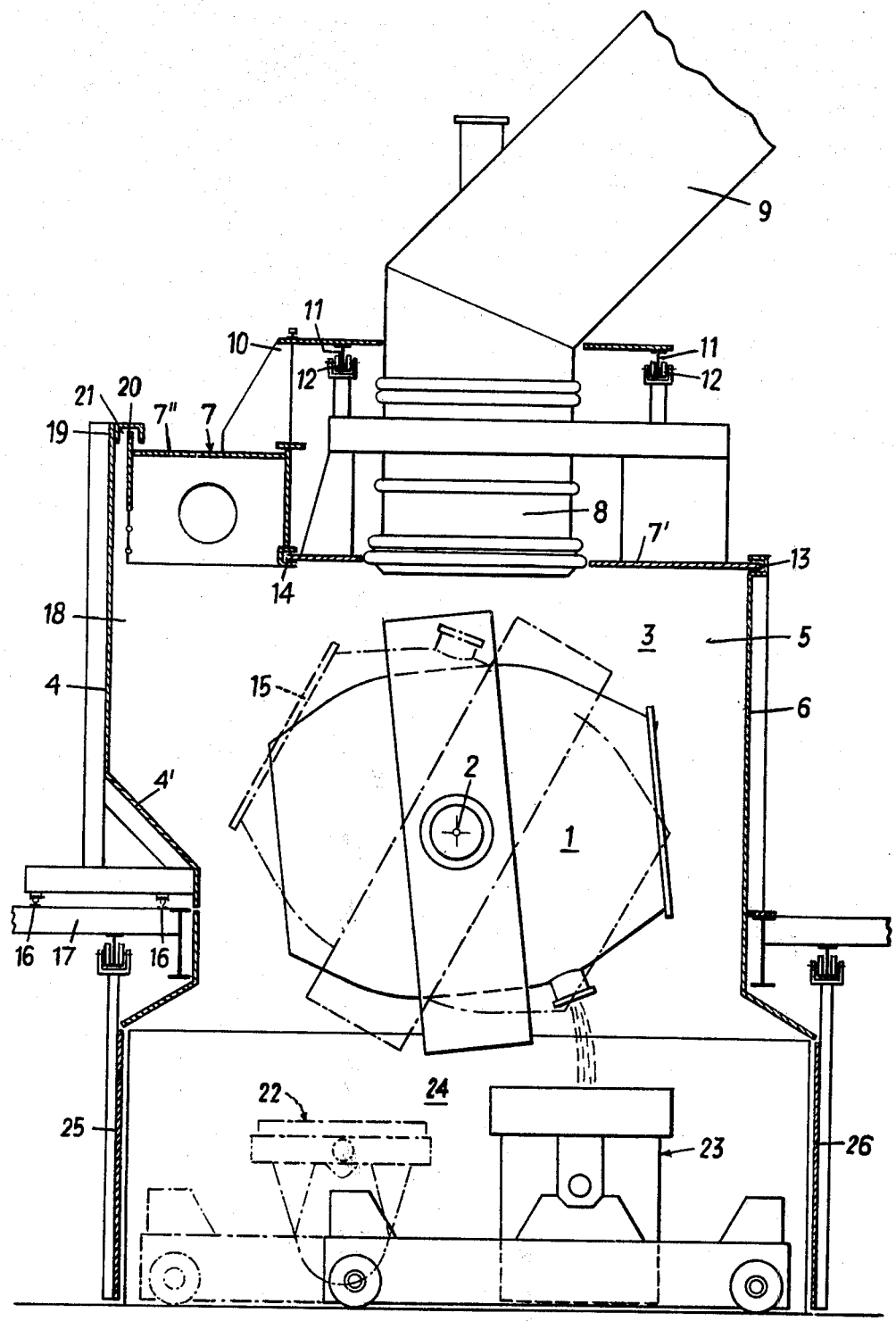

PLANT FOR REFINING PIG IRON

BACKGROUND OF THE INVENTION

The invention relates to a plant, for refining pig iron by means of oxygen or gases enriched with oxygen, having a chamber accommodating a converter, a principal hood connected in the ceiling of the chamber and a closeable charge opening and a secondary hood provided in an upper part of the chamber.

By installing the converter into a chamber nearly closed on all sides, the flue gas forming during the refining procedure, as well as the smoke emerging at the same time, are seized and diverted via the principal hood; but, access to the converter is not easy. This is particularly disadvantageous when charging or repairing the converter.

With converters arranged in chambers, it has been known to supply the pig iron and scrap to be charged, to the converter moutn via special launders or chutes. This is complicated, leading to heat losses and to the formation of smoke and flue gas outside the chamber when pouring the pig iron into the launder. If repair work has to be carried out at the converter, the ceiling of the chamber arranged above the converter, even if the hood is displaceably arranged on the chamber, will have to be dismounted, which wastes time and is complicated. Furthermore, even the side walls have to be removed.

SUMMARY OF THE INVENTION

The invention aims at avoiding these disadvantages and difficulties and has as its object to create a plant of the above-defined kind, in which the converter is easily accessible so that it can be charged in a simple way without having to use an additional launder or chute, and in which the converter and the hood are easily accessible in case of a repair without having to dismount parts of the chamber.

These objects are achieved according to the invention by a combination of the following criteria, i.e.

(a) that the principal hood with a part of the ceiling surrounding it forms a unit displaceable above the converter, (b) that the secondary hood covering the charge opening is united with the part of the ceiling that cannot be moved, and (c) that the charge opening is closeable by a sliding door guided on rails.

According to a preferred embodiment the sliding door is guided only on a pair of rails arranged at a distance below the ceiling and this door comprises, on its upper end, a labyrinth seal coacting with a flange of the secondary hood.

Suitably the principal hood with that part of the ceiling pertaining to it is guided on suspension rails and is sealed off against the stationary chamber walls, as well as the stationary part of the ceiling, by labyrinth seals.

Advantageously, the lower part of the chamber accommodating the converter comprises openings, that are closeable by doors, for moving slag and steel removing cars in and out.

BRIEF DESCRIPTION OF THE DRAWING

The invention will now be explained in more detail by way of one example schematically represented in the drawing which shows a lateral view of a converter in a vertically sectioned chamber.

DESCRIPTION OF AN EXEMPLARY EMBODIMENT

A converter 1 tiltable about an axis 2 is arranged within a chamber 3 having vertical side walls (4, 5 and 6) and a ceiling 7 horizontally covering the latter.

Perpendicularly above the tilting axis 2 of the converter there is provided a principal hood 8 for seizing the flue gases emerging during the refining procedure. The flue gases are sucked off via a flue pipe 9 which is connected with the principal hood and leads to a ventilator and further on to a dedusting plant (both not shown).

The principal hood 8 is combined to form a unit with a part 7' of the ceiling of the chamber, which part directly surrounds the hood. This part 7' of the ceiling is displaceable on a stationary supporting structure 10 in the direction of the tilting axis of the converter, so that the hood 8 can be moved aside, together with that part 7' of the ceiling, the converter thus being easily accessible from above. For this purpose, double-T-carriers 11 are mounted on the stationary supporting structure 10 above the ceiling and form suspension rails on which the ceiling part 7' is guided by means of rollers 12. Labyrinth seals 13, 14 serve for sealing off the displaceable part 7' of the ceiling relative to the stationary chamber parts.

The stationary part 7'' of the ceiling is formed by a secondary hood covering the mouth 15 of the converter when it is tilted into the charging position, which is drawn in the illustration in dot-and-dash lines. It serves for sucking off the flue gases and smoke released during the charging procedure and, like the principal hood, is connected to a flue pipe (not illustrated) leading to a ventilator.

The front side wall 4 of the chamber is designed as a sliding door, which is displaceable on two rails 16 arranged at a distance from each other and mounted to a working platform 17 provided at approximately the height of the tilting axis 2 of the converter. It is opened at the beginning of the charging procedure, a charge opening 18 thus being created. By this opening the converter is easily accessible from the side so that the charging container can be moved by means of a crane to a position right in front of the converter mouth 15. The sliding door 4, on its upper end 19, is sealed off against the ceiling be means of a labyrinth seal 21 overlapping a flange 20 provided on the secondary hood 7''. Since the sliding door 4 is designed as an isolated, plane, perpendicularly arranged plate without an upper guide, no jamming of the door due to warping by heat influence will be caused. On the lower side of the door an inclined slag protection means 4' is provided for guiding the sloped slag downwardly. The sliding door can be designed also in several parts, such as a double-wing door.

Below the converter slag and steel removing cars 22 and 23, respectively, are displaceable for tapping. That space 24 below the converter is closeable by sliding doors 25, 26. By suitably positioning these doors, secondary air can be sucked in, in doses, in order to prevent the under-pressure in the chamber 3 from becoming too pronounced when the sucking off of the flue gases takes place.

By designing the secondary hood 7'' as part of the ceiling 7 of the chamber, it is possible to suck off the smoke gases emerging during tapping not only through the principal hood, but also through the secondary hood.

Since the secondary hood 7" covers the charge opening 18, when the sliding door 4 is opened, no flue gas and smoke can escape through the charge opening.

What we claim is:

1. A plant for refining pig iron by means of oxygen or gases enriched with oxygen, of the type including: a converter; a chamber accommodating the converter, said chamber having an upper part and a lower part formed from stationary chamber walls and a ceiling; a principal hood connected to said ceiling and extending through an aperture therein; a charge opening; a secondary hood covering the charge opeing and being provided in said upper part of said chamber; and closing means for closing said charge opening, characterized in that said ceiling has a stationary part and a displaceable part, said displaceable part surrounding and being united with said principal hood so as to form a displaceable unit above said converter, said displaceable unit, upon being displaced, providing an access opening to the converter for repairs, which opening is greater in size than the aperture for the principal hood;

said secondary hood covering said charge opening is united with said stationary part of said ceiling;

said closing means includes a sliding door and rail means for guiding said sliding door, said rail means being formed by one pair of rails arranged at a distance below said ceiling, said sliding door being guided by said pair of rails and being unguided at its upper end; and a door labyrinth seal provided on the upper end of the sliding door, said secondary hood having a flange and said door labyrinth seal coacting with said flange of said secondary hood.

2. A plant for refining pig iron by means of oxygen or gases enriched with oxygen, of the type including: a converter; a chamber accommodating the converter, said chamber having an upper part and a lower part formed from stationary chamber walls and a ceiling; a principal hood connected to said ceiling; a charge opening and a secondary hood covering it provided in said upper part of said chamber; and closing means for closing said charge opening, characterized in that said ceiling has a stationary part and a displaceable part, said displaceable part surrounding and being united with said principal hood so as to form a displaceable unit above said converter, said secondary hood covering said charge opening is united with said stationary part of said ceiling, and said closing means includes a sliding door and rail means for guiding said sliding door, said sliding door being designed as a plane, perpendicularly arranged plate and a slag protection means extending downwards at an inclined angle toward the chamber interior being provided on said sliding door at the lower end of the inner side thereof.

3. A plant as set forth in claim 1 further comprising suspension rails for guiding said displaceable unit.

4. A plant as set forth in claim 1, wherein said lower part of said chamber is provided with openings and doors are provided in said lower part of said chamber for closing said openings provided in said lower part of said chamber, said plant further including slag removing cars and steel removing cars that are movable through said openings into and out of said lower part of said chamber.

* * * * *